United States Patent
Rooke et al.

(10) Patent No.: US 7,142,842 B2
(45) Date of Patent: Nov. 28, 2006

(54) HYPERKEY ACCESS TO NETWORK-BASED SERVICES

(75) Inventors: Michael Rooke, Hyvinkää (FI); Teppo Savinen, Vihti (FI)

(73) Assignee: Nokia Corporation, Espoo (FI)

( * ) Notice: Subject to any disclaimer, the term of this patent is extended or adjusted under 35 U.S.C. 154(b) by 504 days.

(21) Appl. No.: 10/196,564

(22) Filed: Jul. 16, 2002

(65) Prior Publication Data

US 2004/0203970 A1    Oct. 14, 2004

(51) Int. Cl.
*H04M 3/42* (2006.01)
(52) U.S. Cl. .................. 455/414.1; 455/3.06; 455/561
(58) Field of Classification Search ............... 455/515, 455/422.1, 414.4, 414.1, 3.06, 563, 564, 455/556.1, 432.2, 557, 420; 709/218; 715/500
See application file for complete search history.

(56) References Cited

U.S. PATENT DOCUMENTS 6,308,084 B1    10/2001  Lonka

| | | | |
|---|---|---|---|
| 2001/0004589 A1* | 6/2001 | Massy et al. | 455/414 |
| 2002/0001317 A1* | 1/2002 | Herring | 370/493 |
| 2002/0165801 A1* | 11/2002 | Stern et al. | 705/27 |
| 2003/0051003 A1* | 3/2003 | Clark et al. | 709/218 |
| 2003/0135820 A1* | 7/2003 | Aasman | 715/500 |

* cited by examiner

*Primary Examiner*—Matthew D. Anderson
*Assistant Examiner*—Tan Trinh
(74) *Attorney, Agent, or Firm*—Hollingsworth & Funk, LLC (57) ABSTRACT

A method, system, and device for providing access to network-based services by analyzing a symbol associated with a network service. A representation of a symbol associated with a network service is captured. For example, a graphic symbol associated with a network-connected business may be captured using a mobile telephone equipped with a camera. The symbol may depict a business logo or any other symbol associated with the network service. The representation of the symbol is analyzed by comparing the symbol to a library of ideal symbols. Each ideal symbol is associated with a network address of the network service. If the representation of the symbol matches an ideal symbol, the network address associated with the ideal symbol is used to access the network-based service.

41 Claims, 7 Drawing Sheets

FIG. 7

HYPERKEY ACCESS TO NETWORK-BASED SERVICES

RELATED PATENT DOCUMENT

This application is related to commonly owned U.S. Pat. No. 6,308,084 B1 entitled "MOBILE COMMUNICATIONS DEVICE WITH A CAMERA," incorporated herein by reference in its entirety.

FIELD OF THE INVENTION

The present invention relates generally to network systems, and more particularly, to a system and method for accessing a network-based service.

BACKGROUND OF THE INVENTION

The communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks, such as the Internet, has made available a vast array of information and services. These networking technologies have expanded to include wireless and mobile technologies. Through these networks, information, including multimedia information in the form of pictures, text, audio and video, can be transferred between desktop systems, wireless systems, mobile systems, etc. In addition, users may purchase goods from internet-based businesses and access information and other network-based services through a stationary or mobile internet-connected terminal.

Through multimedia messaging service, multimedia information may be passed between mobile terminals, or between a mobile terminal and an internet-connected server. Furthermore, a mobile multimedia terminal may be capable of producing multimedia information content for transfer to other mobile devices or servers. For example, a multimedia mobile telephone may be equipped with a digital camera for capturing digitized images, in addition to operating as a mobile communications device. Digitized images captured by the multimedia terminal may be transferred through a multimedia messaging service to other mobile terminals or to servers connected to the internet.

Accessing internet-based services through mobile devices has become increasingly prevalent as the number of wireless devices, including mobile telephones, personal data assistants, handheld and laptop computers, continues to expand. Internet-based services are typically accessed though an internet-connected stationary or mobile terminal by typing a character string on the terminal keyboard. For example, to access a business web page using a mobile terminal, a user enters the character string www.business-url.com and presses the send key. The character string represents the web site address, known as the uniform resource locator (URL), locating the internet-based business' web site. After the user enters the URL of the business and presses send, the mobile terminal transmits a message to the web page server of the network-based business to download a web page. The web page server receives the request and transmits the web page content to the terminal. The internet transaction may continue with further correspondence between the mobile terminal and the web page server. If the user wishes to connect to a different site, a new URL may be entered through the mobile terminal. Continued technological advances in communications and data processing will allow simpler and more intuitive access to network-based businesses or services.

SUMMARY OF THE INVENTION

The present invention is directed to a system and method for providing access to a network service web site using a captured image of a symbol or icon associated with the network service. A method according to the present invention involves capturing a representation of a symbol associated with a network service using a wireless terminal. The captured representation is analyzed to determine a network service address of the network service associated with the captured representation. The network service is accessed through the wireless terminal using the network service address.

In another embodiment of the invention, a wireless terminal includes mobile communications circuitry capable of providing mobile telephone and data communications. The wireless terminal further includes a hypersymbol capturing system configured to capture representations of symbols associated with network services. The mobile terminal further includes hypersymbol service initiating circuitry arranged to initiate determination of a network address associated with the captured representation. The mobile communications circuitry provides access to the network service at the determined network service address.

A further embodiment of the invention involves a method for network service access including capturing a digitized representation of a symbol associated with a network service. According to the method, the digitized representation of the symbol is transmitted to a service center for determination of the network service address of the network service associated with the symbol. The network service address is received and the network service accessed using the determined network service address.

Another embodiment of the invention involves a system including a mobile communications terminal configured to provide mobile telephone and data communications. The mobile communications terminal is arranged to capture representations of symbols corresponding to network services. A service center coupled to the mobile terminal receives multimedia messages including the captured representations, determines the network service addresses corresponding to the network services associated with the symbols and provides the mobile terminal with access to the network services associated with the symbols.

In yet a further embodiment of the invention, a method includes capturing a representation of a symbol associated with a network service. The representation of the symbol is analyzed to determine a network service address of the network service associated with the symbol. The network service is accessed using the network service address.

Another embodiment of the invention involves a system for accessing a network service including means for capturing a representation of a symbol associated with a network service using a wireless terminal, means for analyzing the captured representation to determine a network service address of the network service associated with the captured representation, and means for accessing the network service through the wireless terminal using the network service address.

In another embodiment of the invention, a network service access system includes means for capturing a digitized representation of a symbol associated with the network service, means for transmitting the digitized representation of the symbol to a service center for analysis to determine a network service address corresponding to the network service, means for receiving the network service address corresponding to the network service determined from the analysis of the digitized representation from the service center, and means for accessing the network service using the received network service address.

A further embodiment of the invention involves a system including means for capturing a representation of a symbol associated with a network service, means for analyzing the representation of the symbol to determine a network service address of the network service associated with the symbol, and means for accessing the network service using the network service address.

DETAILED DESCRIPTION OF VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention allows a user to gain access to a network site through recognition of a symbol associated the network site. The symbol may, for example, be a graphic symbol, such as a business logo, an audio symbol, such as a set of characteristic notes associated with a TV broadcast network, or the image of an web site address, e.g., www.hypersymbol.com. The graphic symbol or image of a web site URL may be captured, for example, using a terminal equipped with a camera. An audio symbol may be captured, for example, by a terminal equipped with a microphone. The captured symbol may be digitized by the mobile terminal and transmitted to a multimedia messaging service center along with a request for network access services. The multimedia messaging service center may be coupled with a hypersymbol service center for analyzing the symbols provided by the mobile terminal.

At a hypersymbol or hyperglyph service center, the captured symbol is compared to a library of ideal symbols. Each ideal symbol in the symbol library is associated with a network address of a network-based service. If a comparison between the captured symbol and an ideal symbol in the symbol library yields a match, the network address of the network-based service associated with the matching ideal symbol is transmitted via the multimedia messaging service center to the mobile terminal. Alternatively, the hypersymbol service center may initiate a web site transaction on behalf of the mobile terminal.

Figure 1:
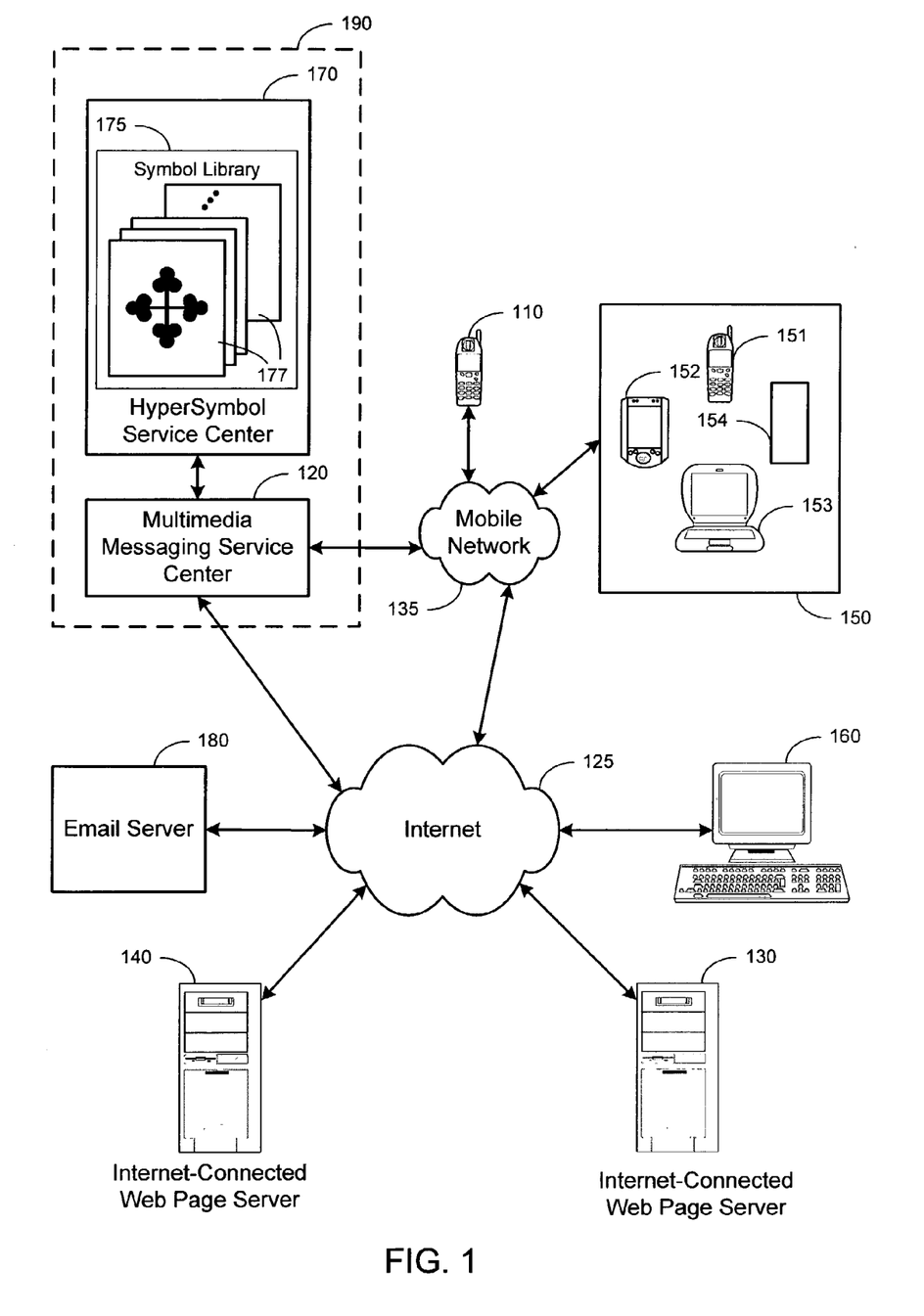
FIG. 1 is a diagram of various architectural elements in a mobile network providing hypersymbol network access in accordance with an embodiment of the invention.

FIG. 1 illustrates a network architecture that may be used to accommodate various types of network connectivity, including, for example, internet access through a mobile communications terminal and multimedia messaging service (MMS) between wireless devices and between wireless devices and wireline servers. As illustrated in the example of FIG. 1, communication and data processing devices may be coupled together through one or more network systems 125, 135. The communication and data processing devices so coupled may include, for example, mobile telephones 110 and other wireless communication terminals 150, workstations 160, email servers 180, and web page servers 130, 140. The web page servers 130, 140, may be operated by internet-based businesses or organizations to provide internet access to business web sites and to provide e-commerce opportunities for customers to purchase products offered by the businesses, for example.

A mobile network 135 may be used to couple mobile communication terminals 110, 150 to each other, or to couple a mobile terminal 110, 150 to other devices 120, 130, 140, 160, 180 accessible through the mobile network 135 or the internet 125. A mobile terminal user may gain access to the web site of a network-based service through a mobile terminal 110, 150 by entering the web site URL address of the internet-connected business or network-based service. A web page file, such as an HTML file, or one or more application programs may be downloaded from the web page server 130, 140 to the mobile terminal 110, 150.

Mobile terminals having multimedia capabilities may transmit and receive information content in a number formats, such as picture, text, audio or video. Multimedia communication devices 150 including personal data assistants (PDA's) 152, multimedia mobile telephones 151, handheld or laptop computers 153, as well as other multimedia wireless devices 154, may be coupled through the mobile network 135 to a service center 190. The service center may include, for example, a multimedia messaging service center 120 and a hypersymbol service center 170. The multimedia messaging service center is typically used to handle multimedia messages between two mobile terminals 110, 150, or between a mobile terminal 110, 150 and an internet-connected device such as an email server 160. The multimedia messaging service center 120 is responsible for storage and control of ingoing and outgoing multimedia messages and for the transfer of messages to different messaging systems, if required.

In accordance with an embodiment of the present invention, the multimedia messaging service center may be coupled with a hypersymbol service center 170. The hypersymbol service center stores a digitized library 175 of ideal symbols 177. The ideal symbols 177 may include corporate logos or other graphic icons associated with a network service or business. The symbol library 175 may also include character strings identifying the URLs of various web sites. Further, the ideal symbol library 175 may include audio symbols associated with a business or network service. Each ideal symbol 177 stored in the symbol library 175 of the hypersymbol service center 170 is associated with a network address or web site.

The representation of a symbol captured by the mobile terminal may be transferred to the multimedia messaging service center 120 as a multimedia message. The captured symbol may be transferred from the multimedia messaging service center 120 to the hypersymbol service center 170 for analysis. At the hypersymbol service center 170, the captured symbol is compared to the library of ideal symbols 175. If a match between the captured symbol and an ideal symbol 177 is discerned, the network address corresponding to the ideal symbol 177 may be transmitted to the mobile terminal 110, 150. Alternatively, or additionally, connection to the network address corresponding to the matching ideal symbol 177 may be initiated by the hypersymbol service center 170 on behalf of the mobile terminal 110, 150.

Figures 2A, 2B:
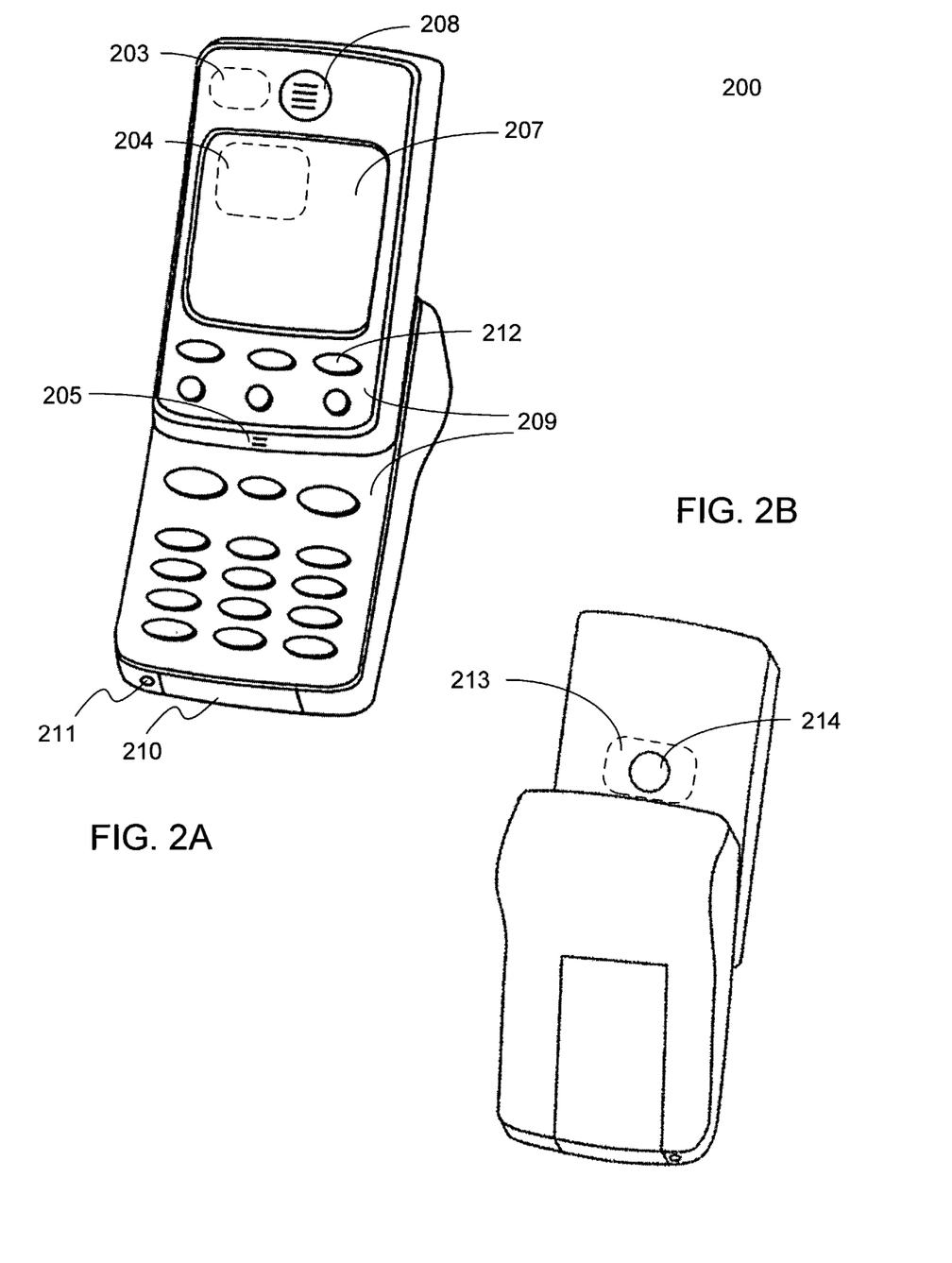
FIGS. 2A and 2B are illustrations of a mobile telephone used hypersymbol access to network services in accordance with an embodiment of the invention.

FIG. 2 is a diagram of a multimedia mobile terminal capable of capturing digital images, sending and receiving multimedia messages, and accessing a network in accordance with an embodiment of the invention. FIG. 2 shows a front and back view of a multimedia mobile terminal 200. The mobile terminal 200 is equipped with camera circuitry 213 including a camera lens 214 exposed on the rear of the mobile terminal. The camera is capable of capturing digital images. The mobile terminal includes a battery 210 and a charging circuit 211 for powering the device. Also included is an internal antenna 203 and associated radio communications circuitry 204 for transmitting and receiving radio communications including multimedia messaging and internet web site content, for example. A microphone 205 converts audio signals into electrical signals, and a speaker 208 converts received radio transmissions into audio. The mobile terminal 200 further includes a display 207 and a keyboard 209. The display may be used to display content from a web page, images produced from the digital camera, text messages, and may further serve as a camera view finder, for example. The keyboard 209 includes function keys for activating various mobile terminal functions, and may include a hyperkey 212 for initiating hypersymbol service, as well as other keys useful for operating the mobile terminal. Hypersymbol service may be initiated using a single specific key, such as the hyperkey, or may be initiated using a menu and/or by pressing one or more standard or programmable keys on the mobile terminal. Furthermore, hypersymbol service may also be initiated using voice recognition techniques by a command spoken into the mobile terminal microphone 205.

Figure 3:
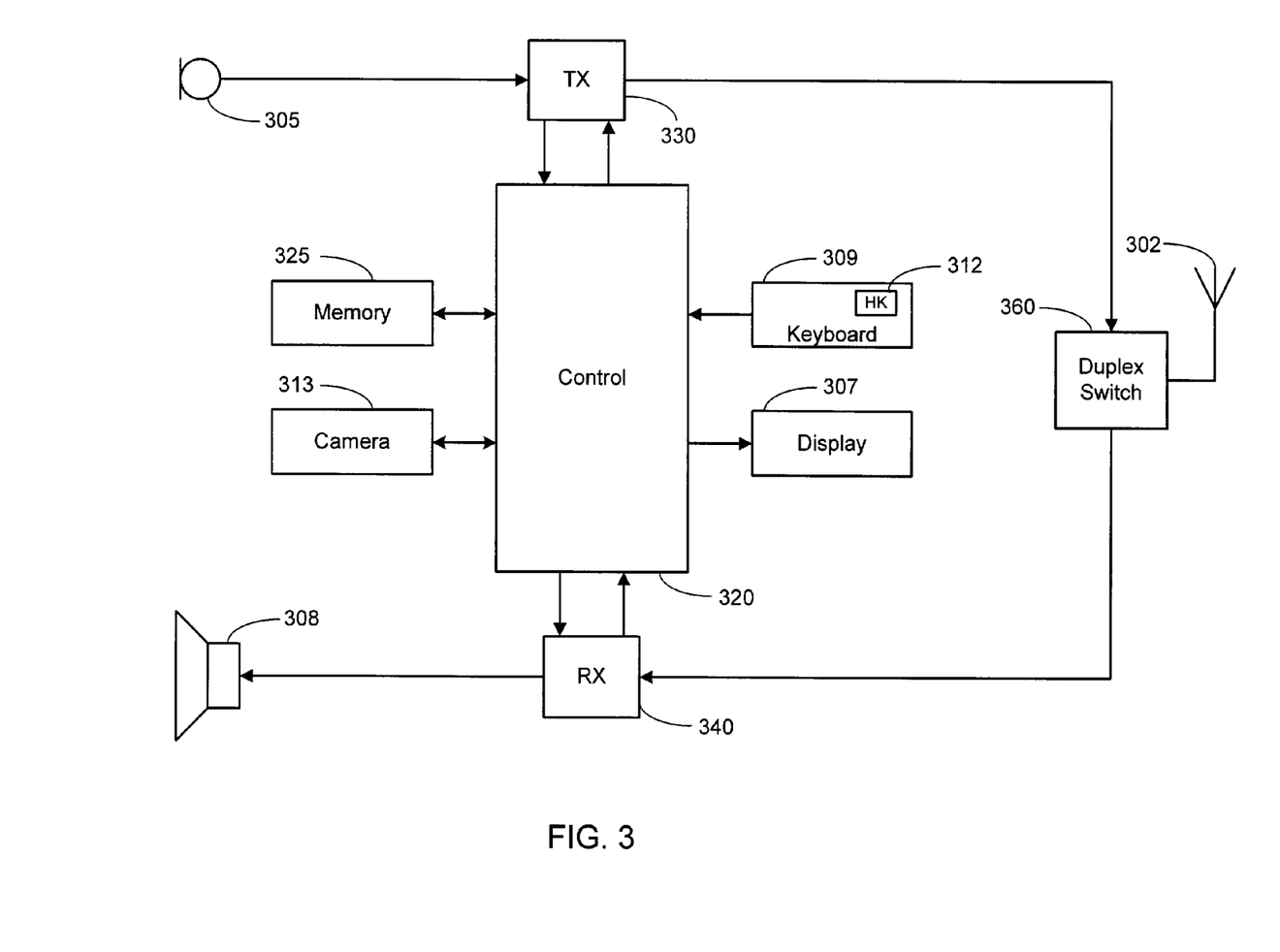
FIG. 3 is a block diagram of a mobile terminal in accordance with an embodiment of the invention.

A block diagram of a multimedia mobile terminal suitable for implementing the methods of the present invention is depicted in FIG. 3. The mobile terminal includes a microphone 305 for detecting and transducing sound into electrical audio signals. The audio signals are processed by transmitter circuitry 330 for transmission through an antenna 302. A duplex switch 360 switches the function of the antenna from transmission to receiving mode.

Incoming radio signals are detected by the antenna 302 and processed by receiver circuitry 340. The processed incoming signals may be used to produce sounds at the loudspeaker 308. The functions of the mobile terminal are controlled by controller circuitry 320 coupled to the transmitter circuitry 330, receiver circuitry 340, keyboard, 309. display 307, camera 313, and memory unit 325. The keyboard 309 includes alphanumeric keys for dialing telephone numbers. The keyboard may also include various function keys allowing a user to easily access the mobile terminal functions. A hyperkey 312 is included for initiating hypersymbol services.

A display 307 may be used to display content from an internet web page, images produced from the digital camera, text messages, and may further serve as a camera view finder, for example. The camera 313 may be activated by one or more keys on the keyboard 309 and used for capturing images. The images may be stored in the memory unit 325 and displayed on the display 307.

Figure 4:
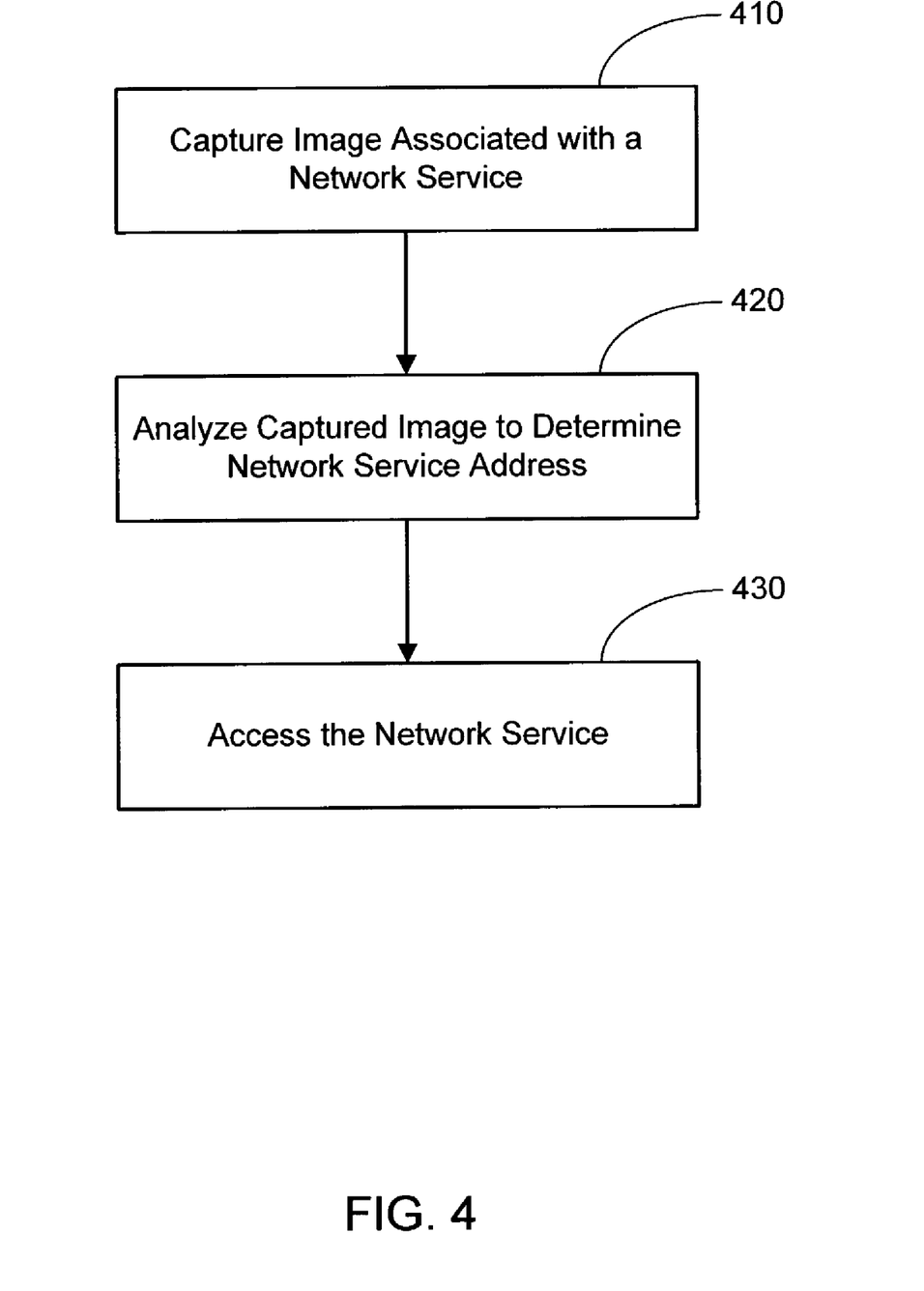
FIG. 4 is a flowchart conceptually illustrating a method of accessing network services in accordance with an embodiment of the invention.

FIG. 4 illustrates, in broad and general terms, a method for accessing a network-based service in accordance with a method of the invention. An image of a symbol associated with a network service is captured 410. For example, a representation of a corporate logo may be captured by the digital camera of the mobile terminal illustrated in connection with FIG. 2. The captured symbol image may be transferred to a hypersymbol service center using multimedia messaging service functionality. The hypersymbol service center stores a library of ideal symbols. Each ideal symbol is associated with a network service address of a network service. The captured symbol image is analyzed 420 to determine the network address of the network service associated with the symbol 420. In one embodiment, the captured symbol image is compared to the library of ideal symbols stored in the hypersymbol service center to determine the network address of the network service associated with the symbol. If an ideal symbol matches the captured symbol image, the network address corresponding to the ideal symbol is determined to be the network address of the network service associated with the symbol. The network service is accessed 430 using the network address determined by the analysis. For example, a web page corresponding to the network service may be accessed through the mobile terminal.

Figure 5:
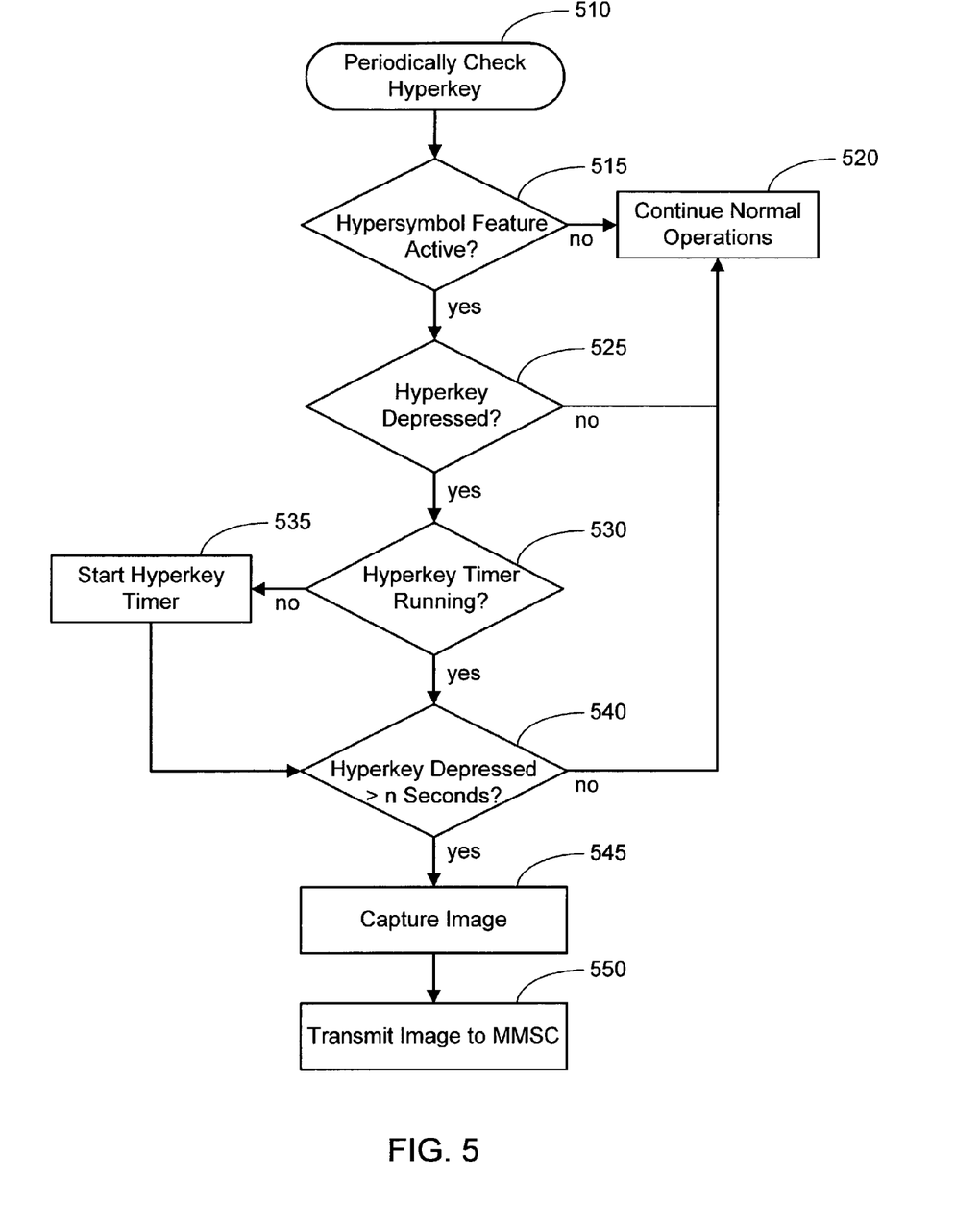
FIG. 5 is a flowchart illustrating operation of a mobile terminal to initiate the hypersymbol service in accordance with an embodiment of the invention.

FIG. 5 is a flowchart illustrating an example operation of a mobile terminal providing hypersymbol access. Hypersymbol access may be a feature selectable by a user, for example. The mobile terminal determines if the hypersymbol feature is active. If the hypersymbol feature is active, and the hyperkey has been depressed for a predetermined length of time, an image is captured and transferred as a multimedia message to a service center. The example depicted in FIG. 5 illustrates a method for invoking the hypersymbol service using a dedicated hyperkey. It will be understood by those skilled in the art that this represents but one possible implementation of invoking the hypersymbol service. Many additional methods may also be used to initiate the hypersymbol service, e.g., by voice recognition, by using a menu, and/or by using one or more standard or programmable keys available on the mobile terminal. Furthermore, the example of FIG. 5 involves capturing a representation of glyph or graphical icon to access a web site. As described previously herein, hypersymbols need not be limited to graphical symbols, and may have various formats, including audio symbols or text strings, for example.

The mobile terminal checks periodically to determine if the hypersymbol feature is selected 510. If the hypersymbol feature is not active 515, the terminal continues normal operations 520. If the hypersymbol feature is active 515, the terminal checks the hyperkey. If the hyperkey is not depressed 525, then no hypersymbol access is presently requested, and the mobile terminal continues normal operations 520. If the hyperkey is depressed 525, hypersymbol access may be requested by a user. If the hyperkey timer is not running 530, the timer is started 535. The hyperkey timer determines the number of seconds the hyperkey is depressed. If the hyperkey is not depressed for more than a predetermined number of seconds 540, then the hypersymbol access process is terminated and the mobile terminal continues with normal operations 520. If the hyperkey is depressed for greater than or equal to a predetermined number of seconds 540, then an image is captured 545 through the mobile terminal camera and transmitted to the multimedia messaging service center (MMSC) 550. The image transmitted to the multimedia messaging service center is compared to the library of ideal symbols in the hypersymbol service center. If the captured symbol image matches an ideal symbol, the network address associated with the ideal symbol may be transmitted to the mobile terminal or other services may be performed.

Hypersymbol access to web sites of network-connected businesses or other organizations provides an intuitive method for accessing services and has a number of advantages. By the methods of the present invention, a mobile terminal user is presented with an easy way to identify and connect to internet address web sites to conduct e-commerce, acquire information, or to access a variety network services. For example, the invention may be implemented by embedding known corporate logos or new symbols in newspaper or magazine advertisements or other printed information. The hypersymbols may, for example, include various features for easy identification, such as a distinctive border, or text, e.g., this is a hypersymbol, printed along the border. A single hypersymbol may be included in an advertisement, the single hypersymbol linking to a business home page. The business home page may optionally provide additional links corresponding to various customer service or e-commerce transactions. Furthermore, a hypersymbol may be used to initiate the execution of an application, e.g., a Java application, used to control the service interaction. A hierarchy of symbols may also be included in an advertisement for providing connection to various customer services web pages within a business web site.

Hypersymbols may be placed unobtrusively in an advertisement, but in such a way that the hypersymbols are easily recognized by a user. For example, a hypersymbol including a football may be printed in a newspaper advertisement using ordinary printing techniques. The advertisement may state, "photograph the ball for information." The user photographs the ball with a multimedia mobile terminal equipped with a camera and presses the hyperkey to initiate hypersymbol service. The mobile terminal transmits the image with the embedded hypersymbol to a multimedia messaging service center. The multimedia messaging service center forwards the image including the embedded hypersymbol to a hypersymbol service center for analysis. The hypersymbol service center compares the hypersymbol embedded in the captured image to a library of ideal symbols. If a match is detected, the user is connected to a web site providing football game results.

In another example, an advertisement may include a printed image of a soft drink corporate logo or other hypersymbol. The user may photograph the image including the hypersymbol using a mobile terminal equipped with a camera and depress the hyperkey on the mobile terminal. The mobile terminal transmits the image with the embedded hypersymbol to a multimedia messaging service center. The multimedia messaging service center forwards the image including the embedded hypersymbol to a hypersymbol service center for analysis. The hypersymbol service center compares the hypersymbol embedded in the captured image to a library of ideal symbols. If a match is detected, the hypersymbol service center may provide information to the mobile terminal, including a map and directions, for locating the nearest soft drink machine.

In yet another example, an advertisement may include a sales hypersymbol. For example, a sales hypersymbol for particular set of skis. The user photographs the sales hypersymbol and depresses the hyperkey on the mobile terminal. The mobile terminal transmits the image with the embedded hypersymbol to a multimedia messaging service center. The multimedia messaging service center forwards the image including the embedded sales hypersymbol to a hypersymbol service center for analysis. The hypersymbol service center compares the hypersymbol embedded in the captured image to a library of ideal symbols. If a match is detected, an e-commerce transaction may be initiated by the hypersymbol service center including an appropriate message prompting the user to purchase a product, e.g. "Do you want to buy the skis?"

In a further example, an advertisement may include the web site URL for a particular business, e.g., www.business-url.com. The user may photograph the business URL using a mobile terminal equipped with a camera and initiate hypersymbol access by depressing the hyperkey. The image of the URL character string captured by the mobile terminal is transferred to the multimedia messaging service center and thus to the hypersymbol service center. At the hypersymbol service center the captured image is analyzed and the symbol embedded in the image is compared to ideal symbols including character strings of business URLs. If the business URL is recognized, the mobile terminal is connected to the appropriate web site.

In yet another example, the multimedia messaging service center may forward the image to another service. For example, a user may be presented with a choice of photographing one symbol to vote "yes" or another symbol to vote "no." The user photographs the image corresponding to the desired vote and depresses the hyperkey, sending the captured symbol to the multimedia messaging service center. The multimedia messaging service center forwards the image to the hypersymbol service center where the image is analyzed and the symbol embedded in the image is compared to ideal symbols. If a match is detected in this case, the image may be forwarded to another service that collects the votes for this particular application.

Figure 6:
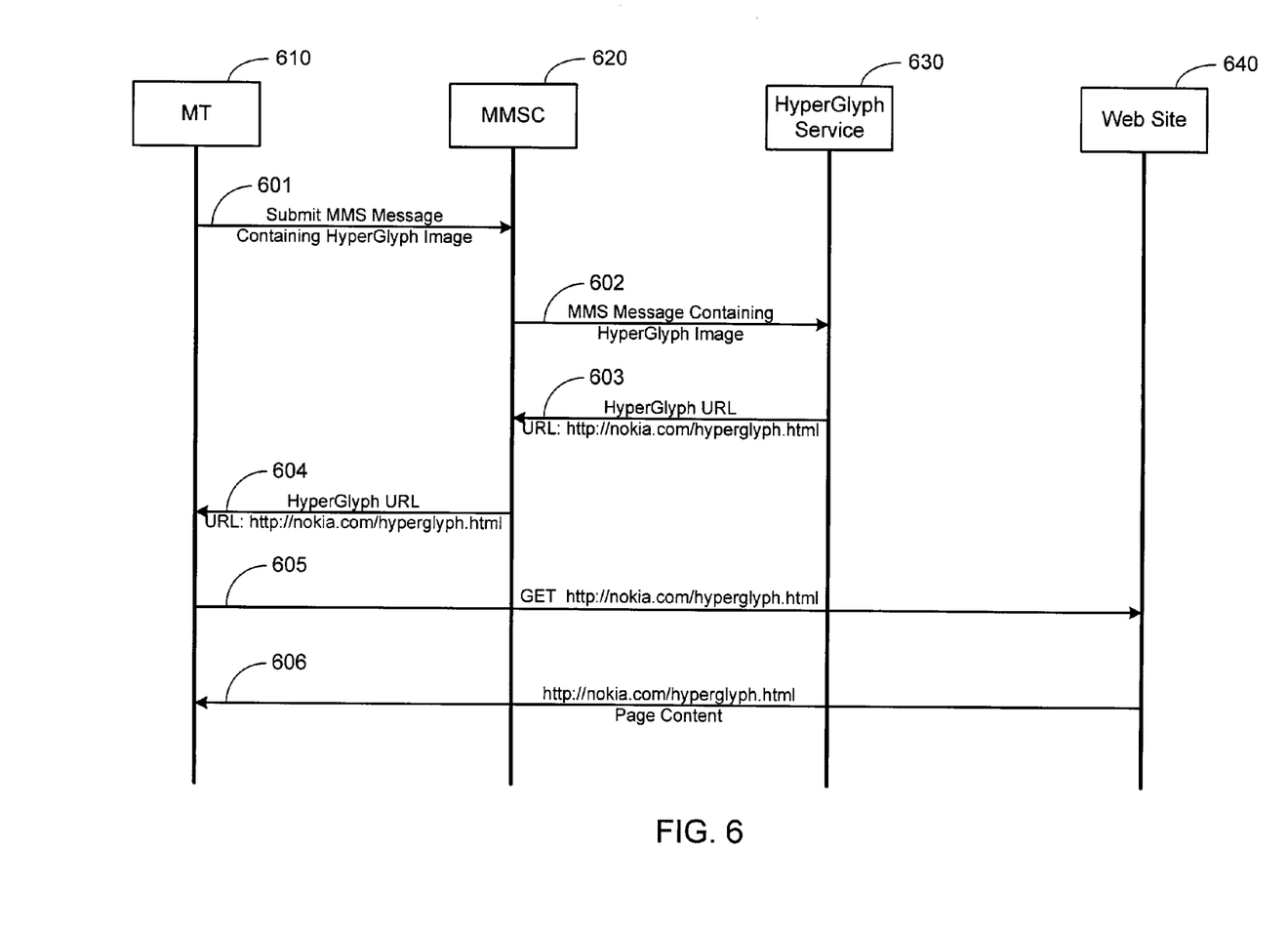
FIG. 6 is a message flow diagram illustrating the communication flow between various devices to accomplish access to a network service website in accordance with an embodiment of the invention.
Figure 7:
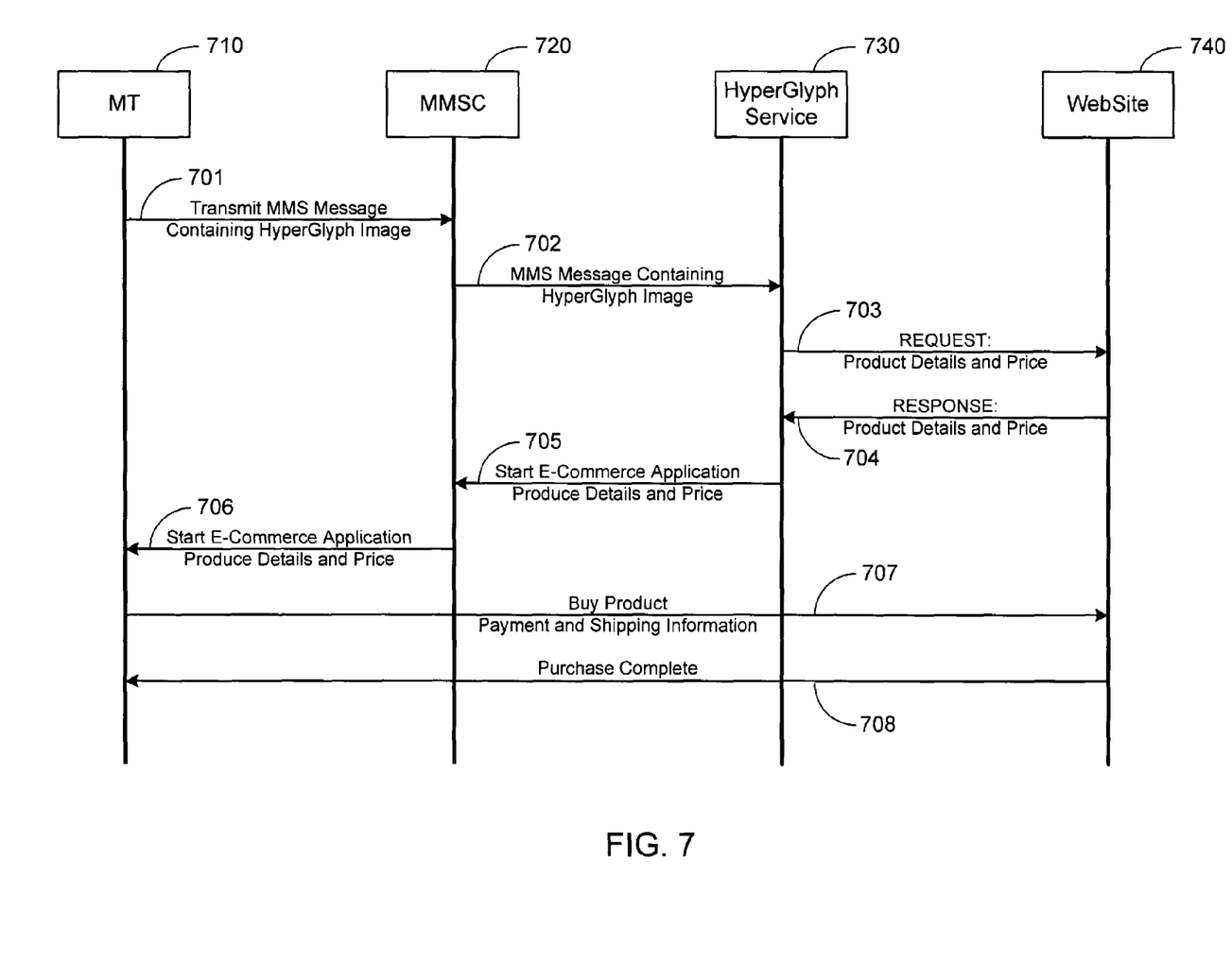
FIG. 7 is a message flow diagram illustrating the communication flow between various devices to accomplish access to a network service site for providing an e-commerce transaction in accordance with an embodiment of the invention.

FIGS. 6 and 7 illustrate message flow between a mobile terminal, multimedia messaging service center, hypersymbol service center and a web page server in accordance with an embodiment of the invention. In the specific examples illustrated in FIGS. 6 and 7, the symbol captured is a graphical icon, otherwise known as a "hyperglyph," and the hypersymbol service center is accordingly denoted the hyperglyph service center. Turning to FIG. 6, a user captures an image containing a hyperglyph associated with a particular web site using a mobile terminal 610 equipped with a camera and depresses the hyperkey to initiate the hyperglyph service. The mobile terminal 610 submits the captured image containing the hyperglyph 601 as a multimedia message to the multimedia messaging service center 620. The multimedia messaging service center 620 receives the multimedia message containing the image and transfers the multimedia message 602 to a hyperglyph service center 630 for processing.

The hyperglyph service center 630 includes a library of ideal symbols. Each ideal symbol corresponds to a specific web site address. The multimedia message including the captured image is compared in the hyperglyph service center 630 to the ideal symbols in the hyperglyph service center symbol library. If an ideal symbol matches the captured symbol, then the web site address corresponding to the ideal symbol is transferred 603 from the hyperglyph service center 630 to the multimedia messaging service center 620. The web site address is forwarded 604 from the multimedia messaging service center 620 to the mobile terminal 610. The mobile terminal user may be given the option of connecting to the web site. If the user requests connection to the web site 640, the mobile terminal 610 requests a download 605 of the web page from the web site 640 using the web site address supplied by the multimedia messaging service center 620. The web page content of the web site 640 is downloaded 606 to the mobile terminal 610.

FIG. 7 illustrates a message flow between a mobile terminal 710, multimedia messaging service center 720, hyperglyph service center 730 and e-commerce web site 740 consistent with an e-commerce application of the present invention. A user captures an image containing a hyperglyph offering an opportunity to purchase a particular item through an e-commerce web site using a mobile terminal 710. For example, the hyperglyph may accompany the text: "Photograph the symbol to purchase the video game" in a printed advertisement. The user photographs the hyperglyph and depresses the hyperkey to initiate the hyperglyph service. The mobile terminal 710 transmits 701 the captured image containing the hyperglyph as a multimedia message to the multimedia messaging service center 720. The multimedia messaging service center 720 receives the multimedia message containing the image and transfers 702 the multimedia message to a hyperglyph service center 730 for processing. The hyperglyph service center 730 includes a library of ideal symbols. Each ideal symbol corresponds to a specific web site address. The multimedia message including the captured symbol is compared in the hyperglyph service center 730 to the ideal symbols in the hyperglyph service center symbol library. If an ideal symbol matches the captured symbol, then the hyperglyph service center 730 accesses the e-commerce web site 740 by transmitting a message 703 to the e-commerce web site 740 requesting product details and pricing information. The e-commerce web site 740 may respond by transmitting 704 the product details and pricing information requested by the hyperglyph service center 730. The hyperglyph service center 730 initiates the e-commerce application by forwarding 705 an e-commerce message, such as "Do you want to purchase the video game," to the multimedia messaging service center 720. The multimedia messaging service center 720 forwards 706 the e-commerce message to the mobile terminal 710. The user may respond affirmatively to the e-commerce request and supply personal information, e.g., credit card and shipping address. The personal information is forwarded 707 to the e-commerce website 740 from the mobile terminal 710. After receiving and validating the personal information, the e-commerce web site 740 transmits 708 to the mobile terminal 710 a message verifying that the e-commerce transaction is successfully completed.

A method for accessing a network service in accordance with the present invention may be tangibly embodied in a computer-readable medium or carrier, e.g. one or more of the fixed and/or removable data storage devices, or other data storage or data communications devices. One or more computer programs expressing the processes embodied on the removable data storage devices may be loaded into various memory elements located within a network accessing system to configure the network accessing system for operation in accordance with the invention. The computer programs comprise instructions which, when read and executed by the network accessing system, cause the network accessing system to perform the steps necessary to execute the steps or elements for capturing a representation of a symbol associated with the network service using a wireless terminal, analyzing the captured representation to determine a network service address of the network service associated with the symbol, and accessing the network service through the wireless terminal using the network service address in accordance with the principles of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

What is claimed is:

1. A method for accessing a network service, comprising:
   capturing a representation of a symbol associated with the network service using a wireless terminal;
   digitizing the captured representation of the symbol;
   transferring the captured representation from the wireless terminal to a multimedia messaging service center as a multimedia message;
   analyzing the captured representation to determine a network service address of the network service associated with the symbol; and
   accessing the network service through the wireless terminal using the network service address.

2. The method of claim 1, wherein capturing the representation comprises digitizing the representation including a graphical icon associated with the network service.

3. The method of claim 1, wherein capturing the representation comprises digitizing the representation including a character string associated with the network service.

4. The method of claim 1, wherein capturing the representation comprises digitizing the representation including a URL character string.

5. The method of claim 1, wherein capturing the representation comprises digitizing an audio symbol associated with the network service.

6. The method of claim 1, wherein analyzing the captured representation further comprises comparing the captured representation to a database of ideal symbols, each ideal symbol corresponding to a particular network service address.

7. The method of claim 1, further comprising transferring the digitized representation from the multimedia messaging service center to a hypersymbol service center for analysis.

8. The method of claim 1, wherein accessing the network service further comprises:
   sending a web site address associated with an ideal symbol corresponding to the captured representation from a service center to the wireless terminal; and
   accessing the web site using web site address.

9. The method of claim 1, wherein accessing the network service further comprises initiating an e-commerce transaction.

10. A wireless terminal, comprising:
a hypersymbol capturing system configured to capture representations of symbols respectively associated with network services and to digitize the captured representations;
hypersymbol service initiating circuitry arranged to transfer the digitized representations from the wireless terminal to a multimedia messaging service center as multimedia messages for determination of network addresses of the network services respectively associated with the symbols; and
mobile communications circuitry for providing mobile telephone and data communications and for accessing the network addresses of the network services associated with the symbols.

11. The wireless terminal of claim 10, wherein the hypersymbol capturing system includes a camera for capturing representations of visual symbols.

12. The wireless terminal of claim 10, wherein the hypersymbol capturing system includes a microphone for capturing representations of audio symbols.

13. The wireless terminal of claim 10, wherein the hypersymbol service initiating circuitry includes a hyperkey for initiating determination of the network address associated with the captured symbol representations.

14. The wireless terminal of claim 10, wherein the hypersymbol service initiating circuitry is configured to initiate an analysis of a captured symbol representation to determine a network address associated with the captured symbol representation.

15. The wireless terminal of claim 14, wherein the hypersymbol service initiating circuitry is configured to initiate the analysis of the captured symbol representations if a hypersymbol function has been selected.

16. The wireless terminal of claim 10, wherein the mobile communications circuitry further comprises:
speaker circuitry for converting electrical signals corresponding to received radio communication transmissions into audible sounds;
display circuitry for producing graphical messages to facilitate the radio transmission communications and serving as a viewfinder for the camera;
transmitter circuitry for transmitting the radio communication transmissions;
receiver circuitry for receiving radio communication transmissions;
a control system coupled to the speaker, display, microphone, camera, keypad transmitter, and receiver, for controlling the operation of the wireless terminal.

17. A method for accessing a network service, comprising: capturing a representation of a symbol associated with the network service;
digitizing the representation;
transmitting the digitized representation of the symbol as a multimedia message to a multimedia messaging service center for analysis to determine a network service address corresponding to the network service;
receiving the network service address corresponding to the network service determined from the analysis of the digitized representation from the multimedia messaging service center; and
accessing the network service using the received network service address.

18. The method of claim 17, wherein capturing the digitized representation of the symbol comprises capturing a graphical symbol.

19. The method of claim 17, wherein capturing the digitized representation of the symbol comprises capturing a character string.

20. The method of claim 17, wherein capturing the digitized representation of the symbol comprises capturing an audio symbol.

21. The method of claim 17, wherein accessing the network service comprises accessing a web page associated with the network service.

22. The method of claim 17, wherein accessing the network service comprises conducting an e-commerce transaction associated with the network service.

23. The method of claim 17, wherein accessing the network service comprises executing a software application to provide access to the network service.

24. A system, comprising
a mobile communications terminal configured to provide mobile telephone and data communications, the mobile terminal arranged to capture representations of symbols corresponding to network services and to digitize the captured representations; and
a service center coupled to the mobile terminal and receiving from the mobile terminal multimedia messages including the digitized captured representations, the service center including a multimedia messaging center configured to transfer multimedia messages to and from the mobile terminal and a hypersymbol service center configured to analyze the digitized captured representations, determine the network service addresses corresponding to the network services associated with the symbols, and provide the mobile terminal with the addresses of the network services associated with the symbols.

25. The system of claim 24, wherein the service center provides the mobile terminal with access to the network services by providing the network service addresses of the network services to the mobile terminal.

26. The system of claim 24, wherein the service center provides the mobile terminal with access to the network services by initiating e-commerce transactions between the mobile terminal and the network services.

27. The system of claim 24, wherein the symbols are audio symbols.

28. The system of claim 24, wherein the symbols are graphic symbols.

29. The system of claim 28, wherein the graphic symbols include at least one feature identifying the graphic symbols as hypersymbols.

30. The system of claim 28, wherein the graphic symbols are character strings.

31. The system of claim 28, wherein the character strings are network address URLs.

32. The system of claim 24, wherein the service center analyzes the captured representations by comparing digital representations of the symbols to ideal symbols stored in the service center.

33. A method for accessing a network service, comprising:
capturing a representation of a symbol associated with a network service;
digitizing the representation;
transferring the representation to a multimedia messaging service center as a multimedia message;
analyzing the representation of the symbol to determine a network service address of the network service associated with the symbol; and accessing the network service using the network service address.

34. The method of claim 33, wherein capturing the representation comprises digitizing the representation including a graphical icon associated with the network service.

35. The method of claim 33, wherein capturing the representation comprises digitizing the representation including a character string associated with the network service.

36. The method of claim 33, wherein capturing the representation comprises digitizing an audio symbol associated with the network service.

37. The method of claim 33, wherein analyzing the captured representation further comprises:
   comparing the captured representation to a database of ideal symbols, each ideal symbol corresponding to a particular network service address.

38. A system for accessing a network service, comprising:
   means for capturing a representation of a symbol associated with a network service using a wireless terminal;
   means for digitizing the captured representation of the symbol;
   means for transferring the captured representation from the wireless terminal to a multimedia messaging service center as a multimedia message;
   means for analyzing the captured representation to determine a network service address of the network service associated with the symbol; and
   means for accessing the network service through the wireless terminal using the network service address.

39. A network service access system, comprising:
   means for capturing a digitized representation of a symbol associated with the network service;
   means for transmitting the digitized representation of the symbol to a multimedia messaging service center as a multimedia message for analysis to determine a network service address corresponding to the network service;
   means for receiving the network service address corresponding to the network service determined from the analysis of the digitized representation from the multimedia messaging service center; and
   means for accessing the network service using the received network service address.

40. A system, comprising:
   means for capturing a representation of a symbol associated with a network service;
   means for digitizing the representation of the symbol;
   means for transferring the representation from the wireless terminal to a multimedia messaging service center as a multimedia message;
   means for analyzing the representation of the symbol to determine a network service address of the network service associated with the symbol; and
   means for accessing the network service using the network service address.

41. A computer-readable medium having computer-executable instructions for accessing a network service, the computer-executable instructions performing a method comprising:
   capturing a representation of a symbol associated with the network service using a wireless terminal;
   digitizing the representation of the symbol;
   transferring the digitized representation from the wireless terminal to a multimedia messaging service center as a multimedia message;
   receiving a network service address corresponding to the network service determined from analysis of the digitized representation by the multimedia messaging service center; and
   accessing the network service through the wireless terminal using the network service address.

* * * * *